May 18, 1943. H. W. GRINTER 2,319,675
LOADING PATCH FOR STRESS-TESTING AIRCRAFT
Filed July 20, 1940
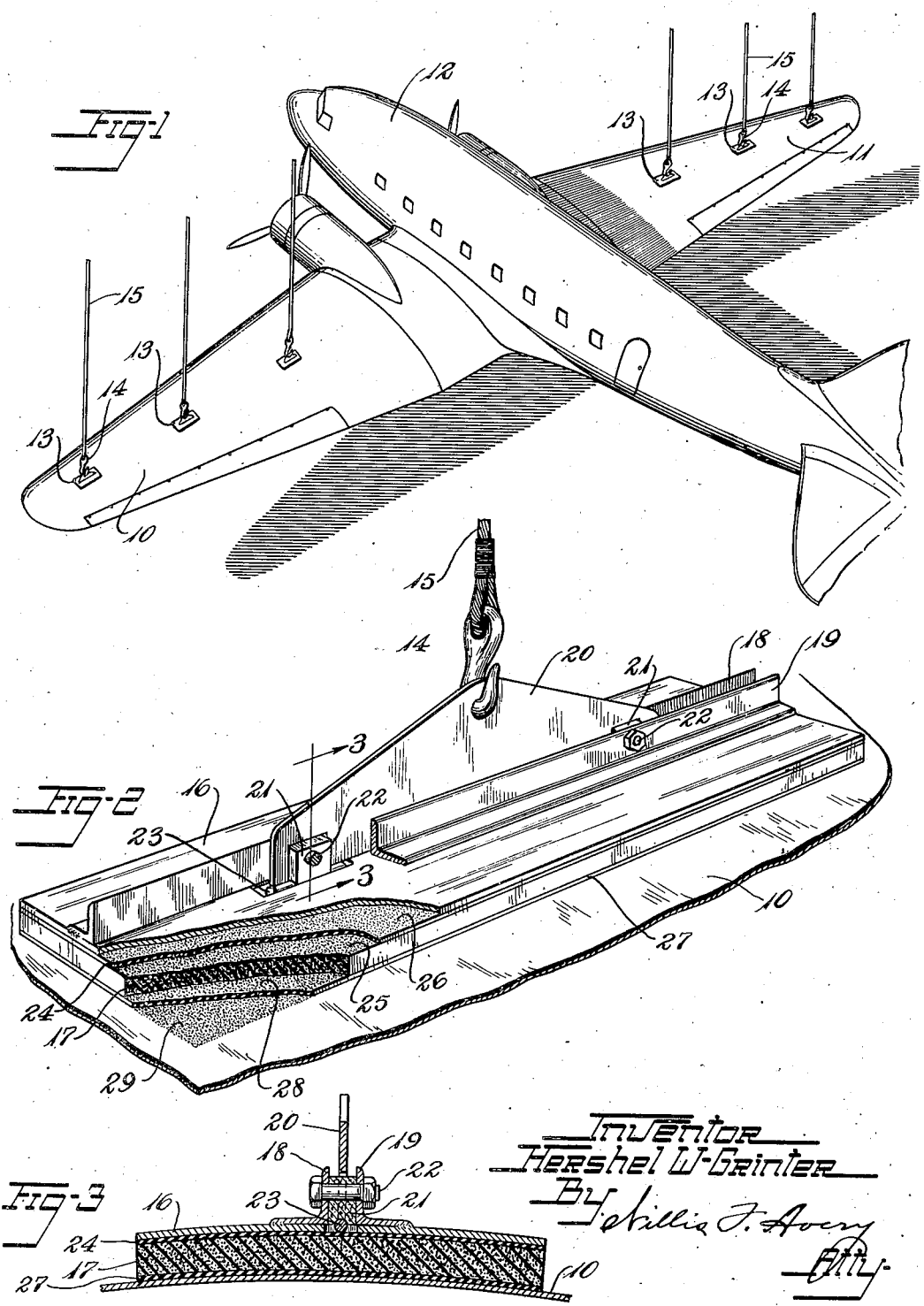

Patented May 18, 1943

2,319,675

UNITED STATES PATENT OFFICE 2,319,675

LOADING PATCH FOR STRESS-TESTING AIRCRAFT

Hershel W. Grinter, Cuyahoga Falls, Ohio, assignor to The B. F. Goodrich Company, New York, N. Y., a corporation of New York Application July 20, 1940, Serial No. 346,584

6 Claims. (Cl. 73—51)

This invention relates to loading patches for stress testing aircraft, and especially to tension loading patches for applying tension loads to wing surfaces and other parts of aircraft through adhesion of the patch to the surface.

A common method used heretofore for applying loads to wings of aircraft has been to turn the craft up-side-down and apply sand bags or other weights to the wings to determine the deflection of the structure under given loads. It has been difficult to apply and to hold the sand bags in the desired positions, and in the case of larger aircraft it is difficult to invert the craft without causing damage to it.

Among attempts to overcome these difficulties it has been proposed heretofore to test the aircraft while it remains upright by adhering patches or pads to the surface of the aircraft and applying the loads by tension, but such a method depends for successful operation upon providing an adequately strong adhesive union between the patch and the surface of the aircraft and between the patch and the tension means. Heretofore this method has not been successfully availed of owing to the want of satisfactory means for adhering the patch to the adjacent surfaces.

The chief objects of this invention are to provide a patch construction and adhering means effective to maintain a strong adhesion to the aircraft skin, even though the skin be of a smooth aluminum alloy, and to provide for effecting the adhesion conveniently by a cold process, that is without requiring the application of heat. Further objects are to provide a pad of such flexibility that it will conform readily to surfaces that are curved, as for camber, and surfaces that have irregularities produced by rivet heads, lapped joints, etc., so that the loading may be applied at any desired position on the aircraft.

These and further objects will be apparent from the following description, reference being had to the accompanying drawing in which:

Fig. 1 is a perspective view of an aircraft of the monoplane type having three tension patches applied to each of its wings.

Fig. 2 is a perspective view of one of the tension patches applied to the wing skin, the patch being constructed according to and embodying the invention, and parts being broken away and sectioned to illustrate the construction.

Fig. 3 is a section taken along the line 3—3 of Fig. 2.

The invention is illustrated as applied to the wings 10, 11 of a monoplane 12. Tension patches indicated at 13, 13 are positioned upon the wing surfaces in the locations at which loading tests are desired, each tension patch being connected through a hook 14 and cable 15 to suitable load-applying means which may involve a pulley and weight system (not shown). Each patch structure comprises a load-applying plate 16, and a flexible pad 17 of soft rubber, preferably comprising sponge rubber, adhered to the lower face of the plate 16 and adapted to be adhered directly to the aircraft skin.

Any suitable means may be provided for connecting the plate 16 to the hook 14 of the cable 15. In the construction illustrated two angle strips 18, 19 are welded to the plate 16 in somewhat spaced-apart relation. Between the angle strips is positioned a member 20 centrally apertured to receive the hook 14 and apertured at its ends to receive blocks 21 mounted upon transverse bolts 22 extending through the angle strips. The member 20 has short rod elements 23 adapted to cooperate with the bottoms of the blocks 21, the plate 16 being recessed for this, to transfer the lifting force from the member 20 to the plate 16 through the intermediary of the rods 23, blocks 21, bolts 22 and angle pieces 18 and 19. Pivotal movements for self-adjustment may occur at the hook 14 and at the rod elements 23 and also at the bolts 22.

While for most applications a flat form of the plate 16 is suitable, it is preferred for surfaces that have appreciable convexity, as in the case of cambered aircraft wings, that the plate 16 be somewhat curved to present a downwardly concave form as shown, for example, in Fig. 3 which has the advantage of making for a more secure attachment of the edges of an adhered rubber patch structure between such plate and the surface of the aircraft, by avoiding an increase of tension at such edges as compared with intermediate regions of the patch.

In order to adhere the sponge rubber pad 17 to the metal surface of the plate 16, I provide first of all a layer 24 of sheet rubber, which for the sake of great surface tack may be unvulcanized. Preferably this layer has the characteristic of toughness so that the degree of "cold flow" is kept as low as possible. This layer of unvulcanized rubber 24 is united to the surface of the sponge rubber 17 preferably with the aid of rubber cement, the coat or coats of which are indicated at 25. The cement is preferably applied to the surface of the sponge rubber following the scrubbing of the sponge surface with a solvent until the surface of the sponge swells, the rubber cement being applied before the swelling recedes so as to become firmly united therewith. In another construction the layer 24 may be united with the sponge rubber layer 17 during the vulcanization of the latter. The layer 24 may be left uncured or only partly cured, or in some cases it may be fully cured, in which case it will be desirable to have its surface tack increased, as by the use of solvents.

For uniting the layer 24 of unvulcanized rubber to the surface of the metal I have found that excellent results may be obtained by the use of an adhesive 26 taken from the class of thermoprenes, preferably applied in a step-off construction of a plurality of attaching coats of thermoprene adhesive and rubber cement, to provide a relatively stiff attachment at the face of the metal and a relatively flexible attachment at the surface of the rubber with a progressive increase of the stiffness from the surface of the rubber to the surface of the metal.

Thermoprenes are thermoplastic unsaturated hydrocarbon isomers having less chemical unsaturation than rubber. They are made as disclosed, for example, in U. S. Patent No. 1,605,180 to Harry L. Fisher, and in the paper published at Industrial and Engineering Chemistry 19, 1325 (1927).

At the surface of the metal 16 one or more coats of thermoprene cement may be applied followed by several coats of mixed thermoprene cement and rubber cement, the proportion of rubber cement being increased progressively as the coats are remote from the metal surface. At the surface of the rubber 24 preferably no thermoprene is used in the coats, but only rubber cement. Thus, by the step-off construction strong bonds are provided at the metal and at the rubber and these bonds have intermediate coats uniting them by progressively changed proportions of the rubber cement and thermoprene cement.

At the other face of the sponge rubber pad 17 there is provided a second layer 27 of unvulcanized rubber composition secured to the surface of the sponge rubber through a coating 28 corresponding to coating 25 and adhered to the surface 10 of the aircraft through coatings 29 corresponding to the coatings hereinabove described at 26.

Patches constructed and adhered in the manner hereinabove described have been found to sustain tension loads upon heavy aircraft for long periods of time without tearing loose. The entire application may be conveniently performed cold, requiring no application of heat.

When the testing has been completed and it is desired to remove the patch from the skin of the airplane, this may be effected by applying a solvent at the edges of the patch and gradually working the patch loose introducing the solvent as the patch is loosened.

Variations may be made without departing from the scope of the invention as it is defined in the following claims.

I claim:

1. A loading patch structure for the stress-testing of aircraft, said patch structure comprising a stiff plate having a concave face conforming approximately to the curvature of the portion of the skin of the aircraft to be tested, and a body of resilient rubber material adhered to the concave face of said plate and having an opposite face adapted to be adhered throughout said face to the skin of the aircraft, said body being of substantially uniform thickness and yieldability throughout the area of said face thereof.

2. A loading patch structure for the stress-testing of aircraft, said patch structure comprising a metal plate, a body of sponge rubber at a face of said plate, a layer of dense rubber material between said plate and said body of sponge rubber and united to said body, and a uniting material between said dense rubber layer and said plate, said uniting material comprising a thermoprene, and said structure having a face opposite said plate adapted for adhesion to the skin of the aircraft.

3. A loading patch structure for the stress-testing of aircraft, said patch structure comprising a metal plate, a body of sponge rubber at a face of said plate, a layer of dense rubber material between said plate and said body of sponge rubber and united to said body, a uniting material between said layer and said plate, said uniting material comprising a thermoprene at said plate, rubber cement at the surface of said layer and a mixture of thermoprene and rubber cement intermediate said thermoprene and rubber cement, and said structure having a face opposite said plate adapted for adhesion to the skin of the aircraft.

4. A tension-loading patch structure for tension-loading an aircraft skin comprising a metal plate, a layer of highly flexible rubber material disposed between said plate and said skin, means for adhering said layer to said plate and skin comprising thermoprene adhesive at said plate and skin, rubber material at the faces of said layer, and mixtures of thermoprene and rubber material intermediate said faces and thermoprene.

5 A loading patch structure for tension-loading an aircraft skin comprising a metal plate and a cushioning and force-transmitting body adhered to the face of said plate, said body comprising, in order, layers of thermoprene adhesive, a mixture of thermoprene adhesive and rubber cement, rubber cement, dense rubber material, rubber cement, sponge rubber, rubber cement, and dense rubber material, the latter having a face adapted for adhesion to the skin of aircraft by coatings, in order, of rubber cement at said face, a mixture of rubber cement and thermoprene, and thermoprene.

6. A loading patch structure for the stress-testing of aircraft, said patch structure comprising a metal plate, a body of sponge rubber at a face of the plate, a layer of dense rubber material interposed between said body and said plate and adhered to both, and a layer of dense rubber material at the opposite face of said body and adhered thereto, the last said layer of dense rubber material having a face adapted for adhesion throughout said face to the skin of the aircraft.

HERSHEL W. GRINTER.